(12) United States Patent
Fujimoto et al.

(10) Patent No.: US 8,701,849 B2
(45) Date of Patent: Apr. 22, 2014

(54) OIL PASSAGE STRUCTURE FOR HYDRAULIC CLUTCH OF AN ENGINE

(75) Inventors: Yasushi Fujimoto, Wako (JP); Kinya Mizuno, Wako (JP); Yoshiaki Tsukada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 498 days.

(21) Appl. No.: 13/041,773

(22) Filed: Mar. 7, 2011

(65) Prior Publication Data

US 2011/0233024 A1 Sep. 29, 2011

(30) Foreign Application Priority Data

Mar. 26, 2010 (JP) ................................. 2010-072638

(51) Int. Cl.
*F16D 25/0638* (2006.01)
*F16D 25/10* (2006.01)

(52) U.S. Cl.
USPC ............... 192/48.611; 192/85.25; 192/85.61; 192/106 F; 192/113.5

(58) Field of Classification Search
USPC ....................... 192/85.25, 85.61, 106 F, 113.5
See application file for complete search history.

(56) References Cited

U.S. PATENT DOCUMENTS

| 4,157,750 A | * | 6/1979 | Horsch | 192/85.61 |
| 5,577,588 A | * | 11/1996 | Raszkowski | 192/85.61 |
| 5,755,314 A | * | 5/1998 | Kanda et al. | 192/85.61 |
| 5,887,690 A | * | 3/1999 | Haupt | 192/48.611 |

FOREIGN PATENT DOCUMENTS

| JP | 51-99755 A | 9/1976 |
| JP | 06-147302 A | 5/1994 |
| JP | 07-042761 | 2/1995 |
| JP | 2001-304293 A | 10/2001 |
| JP | 2002-206601 A | 7/2002 |
| JP | 2008-089064 A | 4/2008 |

* cited by examiner

*Primary Examiner* — David D Le
*Assistant Examiner* — Jacob S Scott
(74) *Attorney, Agent, or Firm* — Squire Sanders (US) LLP

(57) ABSTRACT

A lubricating oil passage 113 includes an upstream oil passage 113a defined coaxially in a rotational shaft 71 for supplying lubricating oil to lubricated parts and a downstream oil passage 113b connected to the upstream oil passage 113a for supplying lubricating oil to canceler chambers 97, 107. The downstream oil passage 113b may be smaller in diameter than the upstream oil passage 113a and having at least a portion extending parallel to the axis of the rotational shaft 71. Control oil passages 111, 112 which have axes parallel to the axis of the rotational shaft 71 are defined in the rotational shaft 71 such that at least a portion of the control oil passages 111, 112 is disposed in a range wherein the downstream oil passage 113b is provided in a direction along the axis of the rotational shaft 71.

20 Claims, 8 Drawing Sheets

OIL PASSAGE STRUCTURE FOR HYDRAULIC CLUTCH OF AN ENGINE

BACKGROUND

1. Field

Embodiments of the present invention relate to an oil passage structure for a hydraulic clutch of engines.

2. Description of the Related Art

Japanese Patent Laid-Open No. Hei 7-42761 describes a hydraulic clutch wherein lubricating oil is introduced into a canceler chamber in order to cancel hydraulic pressure which is generated in a control hydraulic chamber under a centrifugal force. This hydraulic clutch includes a clutch piston having an end facing the control hydraulic chamber and the other end facing the canceler chamber.

As shown in FIGS. 1 and 2 of Japanese Patent Laid-Open No. Hei 7-42761, the diameters of a lubricating oil passage and a control oil passage which are defined in a rotational shaft have to be about the same as each other in order to avoid physical interference between the lubricating oil passage and the control oil passage. There is a demand for a lubricating oil passage of increased diameter for supplying a sufficient amount of lubricating oil to lubricated parts.

SUMMARY

Embodiments of the present invention have been made in view of the above demand. One object of an embodiment of the present invention is to provide an oil passage structure for a hydraulic clutch for engines, which is capable of supplying a sufficient amount of lubricating oil to lubricated parts.

One embodiment of the present invention includes an oil passage structure for a hydraulic clutch of an engine. The hydraulic clutch is mounted on a rotational shaft having an axis parallel to a crankshaft and rotatably supported in a crankcase. The engine includes a hydraulic clutch including a clutch piston for selectively switching between an engaged state and a disengaged state in response to axial movement thereof. The clutch piston having opposite surfaces facing a control hydraulic pressure chamber and a canceler chamber, respectively. A control oil passage is connected to the control hydraulic pressure chamber, and a lubrication oil passage is connected to the canceler chamber, for supplying lubricating oil to lubricated parts around the rotational shaft. The lubricating oil passage includes an upstream oil passage defined coaxially in the rotational shaft for supplying lubricating oil to the lubricated parts around the rotational shaft, and a downstream oil passage connected to the upstream oil passage for supplying lubricating oil from the upstream oil passage to the canceler chamber. The downstream oil passage may be smaller in diameter than the upstream oil passage and have at least a portion extending parallel to the axis of the rotational shaft. The control oil passage may have an axis parallel to the axis of the rotational shaft and is defined in the rotational shaft such that at least a portion of the control oil passage is disposed in a range wherein the downstream oil passage is provided in a direction along the axis of the rotational shaft.

According to another embodiment, a plurality of the control oil passages and the downstream oil passage which are connected individually to a plurality of the control hydraulic pressure chambers of a plurality of the hydraulic clutches which are juxtaposed along the axis of the rotational shaft are defined in the rotational shaft such that the control oil passages and the downstream oil passage are disposed at a position wherein the control oil passages and the downstream oil passage are partly superposed on the upstream oil passage on a projection onto a plane perpendicular to the axis of the rotational shaft.

According to another embodiment, the control oil passages and the downstream oil passage are disposed at equal intervals in a circumferential direction of the rotational shaft.

According to an embodiment, the downstream oil passage and the control oil passages have the same diameters.

According to another embodiment, the downstream oil passage and the control oil passages have respective outer ends along a radial direction of the rotational shaft which are disposed outwardly of an inner circumferential surface of the upstream oil passage. The downstream oil passage and the control oil passages also have respective inner ends along the radial direction of the rotational shaft which are disposed outwardly of a central axis of the upstream oil passage.

According to an embodiment, the downstream oil passage which may be drilled together with the control oil passages axially into one end of the rotational shaft is connected to the upstream oil passage which may be drilled axially into the other end of the rotational shaft.

According to another embodiment, a first hydraulic clutch and a second hydraulic clutch are mounted on the rotational shaft such that the first hydraulic clutch is disposed closer to one end of the rotational shaft along the axis thereof. The upstream oil passage of the lubricating oil passage extends from the other axial end of the rotational shaft such that the upstream oil passage has an inner end disposed at a position which is aligned, as viewed in side elevation, with the second hydraulic clutch.

According to an embodiment, at least a portion of the downstream oil passage is defined in a cylindrical tubular shaft which coaxially surrounds the rotational shaft for applying rotational power to the first and second hydraulic clutches and extends parallel to the axis of the rotational shaft.

Another embodiment includes a hydraulic clutch for an engine. The hydraulic clutch is mounted on a rotational shaft having an axis parallel to a crankshaft and rotatably supported in a crankcase. The hydraulic clutch includes switching means for selectively switching between an engaged state and a disengaged state in response to axial movement of the switching means. The switching means comprises opposite surfaces facing a control hydraulic pressure chamber and a canceler chamber, respectively. The hydraulic clutch also includes first supplying means, connected to said control hydraulic pressure chamber, for supplying oil, and second supplying means, connected to said canceler chamber, for supplying lubricating oil to lubricated parts around said rotational shaft. The second supplying means comprises an upstream supplying means defined coaxially in said rotational shaft for supplying lubricating oil to the lubricated parts around the rotational shaft, and downstream supplying means connected to said upstream oil passage for supplying lubricating oil from said upstream supplying means to said canceler chamber. The downstream supplying means is smaller in diameter than said upstream supplying means and has at least a portion extending parallel to the axis of said rotational shaft, and the first supplying means has an axis parallel to the axis of said rotational shaft and is defined in said rotational shaft such that at least a portion of said first supplying means is disposed in a range wherein said downstream supplying means is provided in a direction along the axis of said rotational shaft.

Another embodiment includes a method including providing a hydraulic clutch for an engine which is mounted on a rotational shaft having an axis parallel to a crankshaft and rotatably supported in a crankcase. The method also includes selectively switching, by a clutch piston, between an engaged state and a disengaged state in response to axial movement of the clutch piston. The clutch piston comprises opposite surfaces facing a control hydraulic pressure chamber and a canceler chamber, respectively. The method also includes supplying oil by a control oil passage connected to said control hydraulic pressure chamber, and supplying, by a lubrication oil passage connected to said canceler chamber, lubricating oil to lubricated parts around said rotational shaft. The supplying of the lubricating oil comprises supplying, by an upstream oil passage defined coaxially in said rotational shaft, lubricating oil to the lubricated parts around the rotational shaft, and supplying, by a downstream oil passage connected to said upstream oil passage, lubricating oil from said upstream oil passage to said canceler chamber. The method also includes configuring the downstream oil passage to be smaller in diameter than said upstream oil passage and to have at least a portion extending parallel to the axis of said rotational shaft. The control oil passage has an axis parallel to the axis of said rotational shaft and is defined in said rotational shaft such that at least a portion of said control oil passage is disposed in a range wherein said downstream oil passage is provided in a direction along the axis of said rotational shaft.

DETAILED DESCRIPTION

Embodiments of the present invention will be described below with reference to the accompanying drawings.

Figure 1:
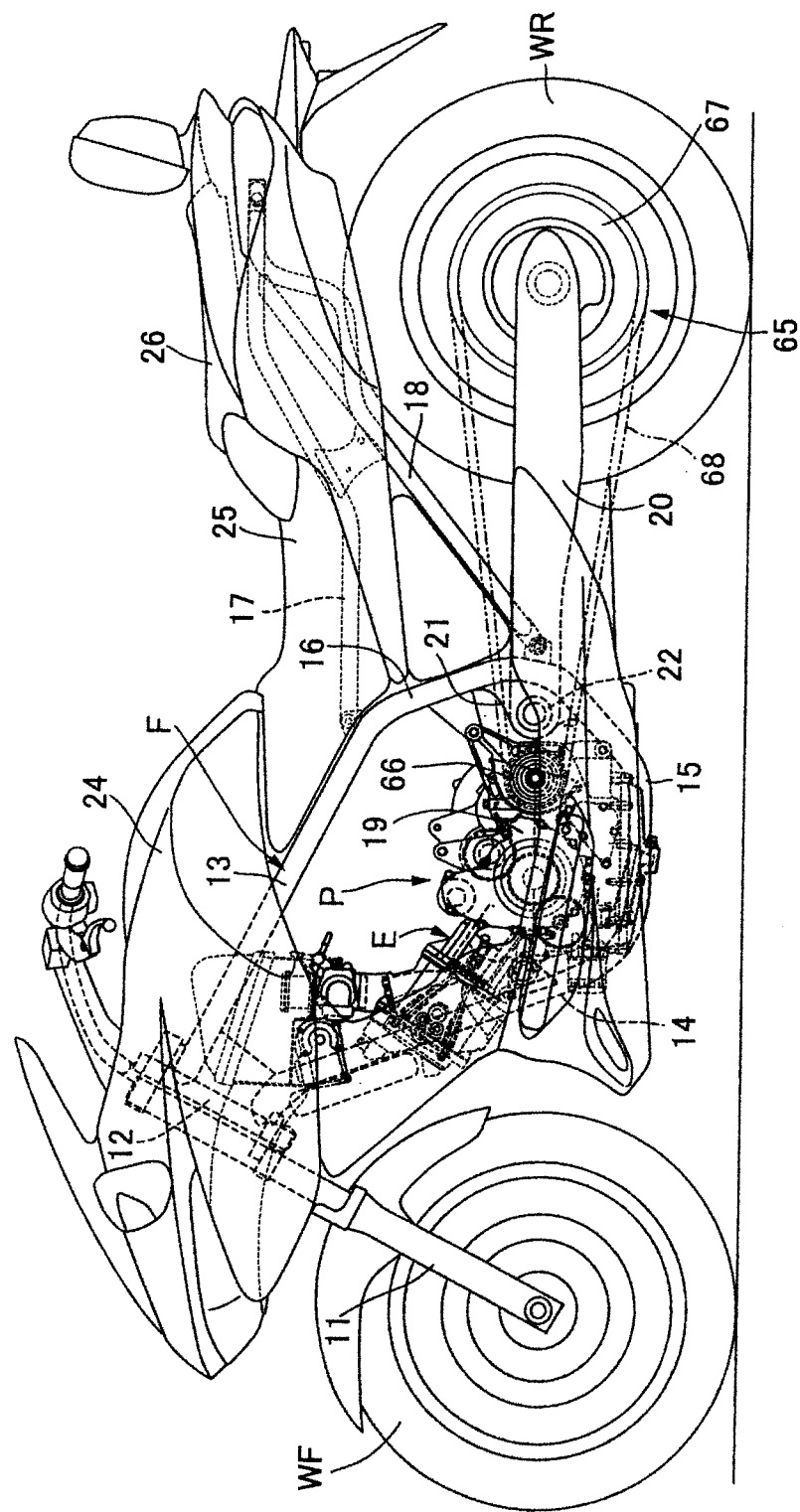
FIG. 1 is a side elevational view of a motorcycle according to one embodiment.

One embodiment of the present invention will be described below with reference to FIGS. 1 through 7. As shown in the example of FIG. 1, a vehicle, such as a motorcycle, has a vehicle body frame F including a head pipe 12 on which a front fork 11 is steerably supported. A front wheel WF may be supported on the front fork 11 by a shaft. A pair of left and right main frames 13 extend rearwardly and downwardly from the head pipe 12, and a pair of left and right down frames 14 may extend rearwardly and downwardly from the head pipe 12 more steeply than the main frames 13. A pair of left and right lower frames 15 extend rearwardly from the lower ends of the down frames 14, and a pair of left and right central frames 16 extend downwardly from the rear ends of the main frames 13 and are joined to the rear end of the lower frames 15. A pair of left and right seat rails 17 may extend rearwardly and upwardly from the rear ends of the main frames 13, and a pair of left and right rear frames 18 interconnect the lower portions of the central frames 16 and the rear portions of the seat rails 17. The main frames 13, the down frames 14, the lower frames 15, and the central frames 16 can be formed from bent metal pipes integrally joined together.

Figure 3:
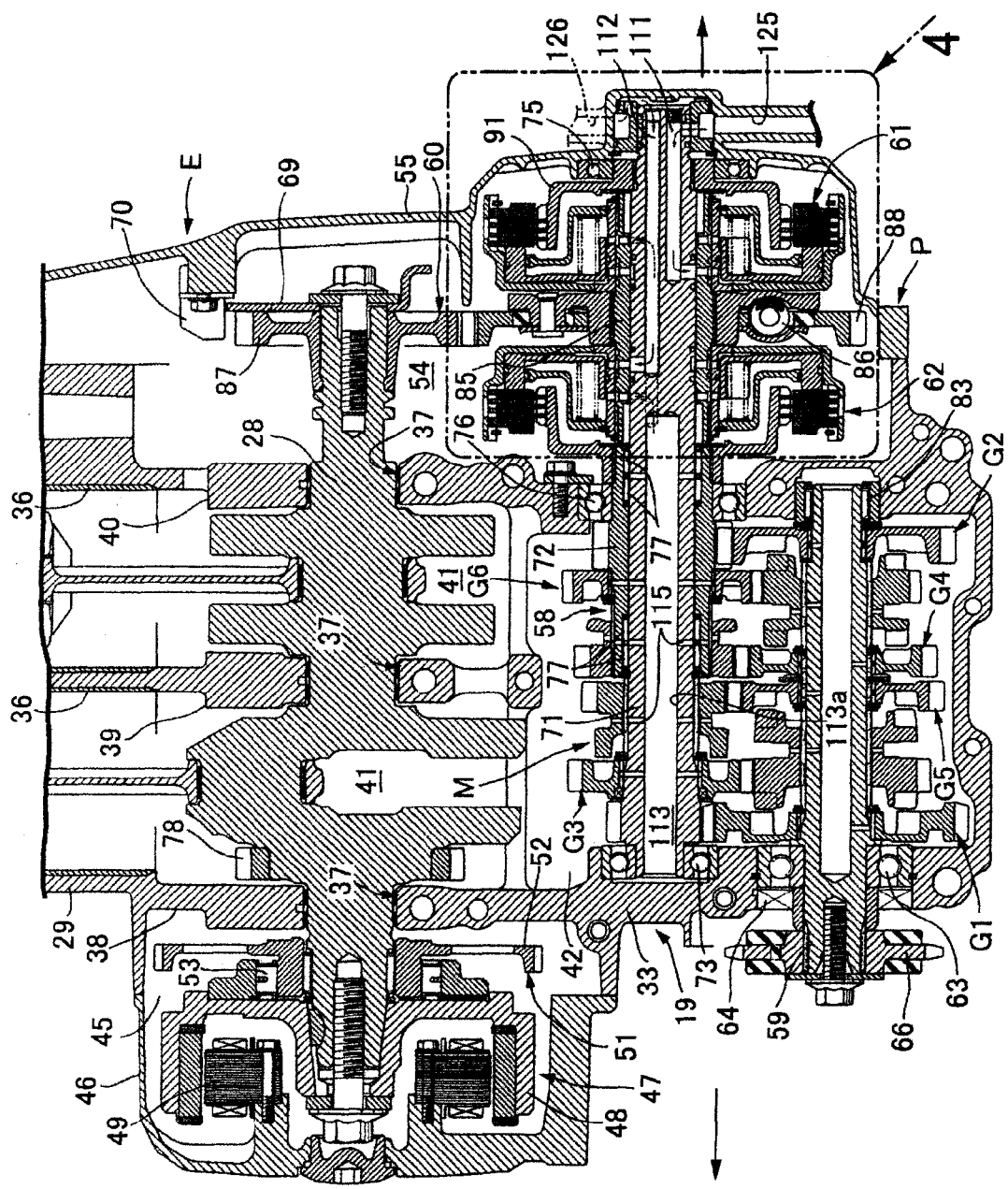
FIG. 3 is a cross-sectional view taken along line 3-3 of FIG. 2.

According to an embodiment, a power unit P may include a multicylinder, for instance two-cylinder, engine E and a gear transmission M (see FIG. 3). The gear transmission M may be partly housed in a crankcase 19 of the engine E and disposed in a region that is surrounded by the main frames 13, the down frames 14, the lower frames 15, and the central frames 16 such that the power unit P is supported by the vehicle frame F. A rear wheel WR may be is driven by power generated by the power unit P and is supported by a shaft on the rear end of a swing arm 20. The swing arm 20 has a front end vertically swingably supported by a support shaft 22 on pivot plates that is disposed on lower portions of the central frames 16. A fuel tank 24 may be mounted on the main frames 13 above the engine E. The front seat rails 17 can support thereon a front riding seat 25 disposed rearwardly of the fuel tank 24 and a rear riding seat 26 disposed rearwardly of the front riding seat 25.

Figure 2:
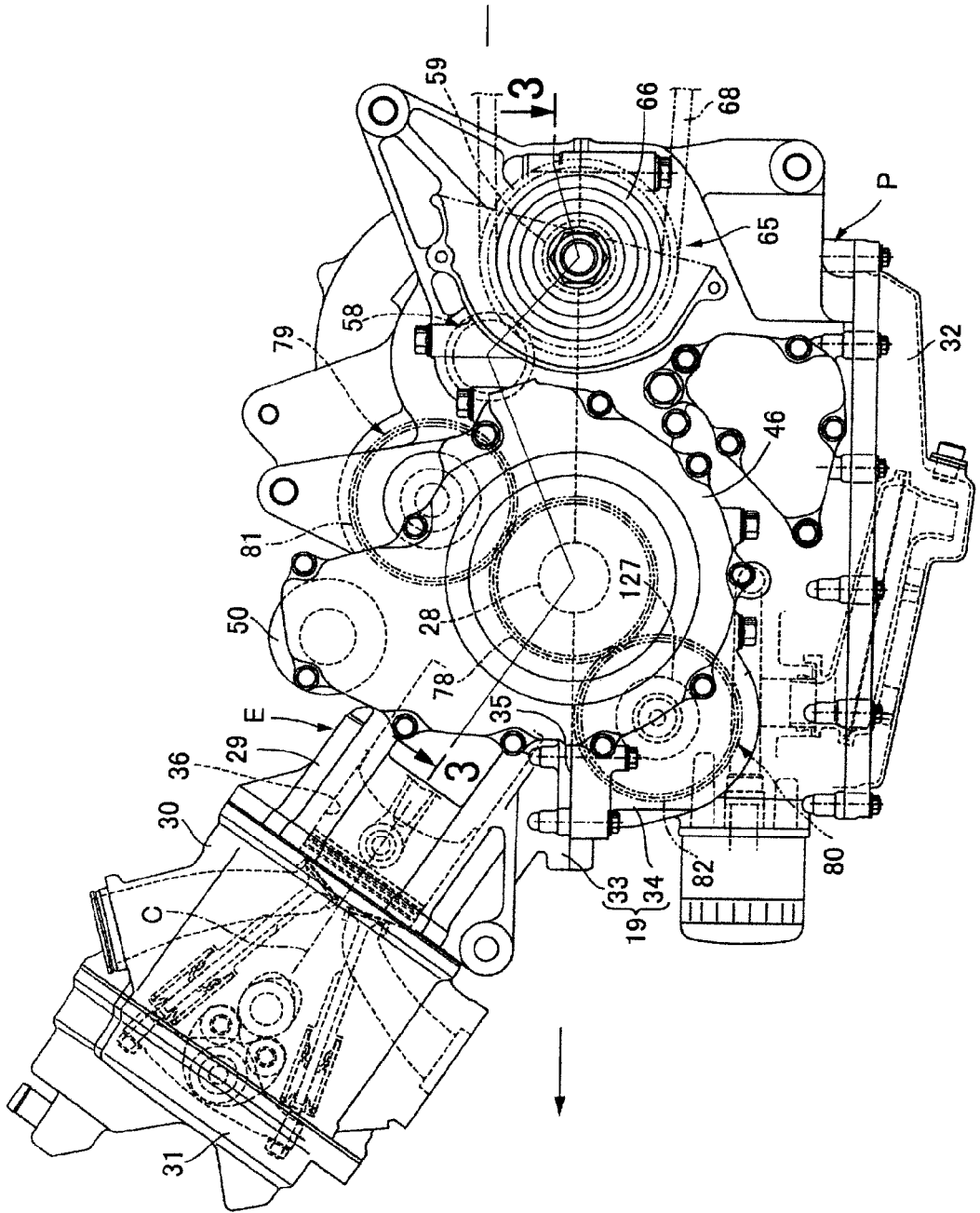
FIG. 2 is a side elevational view of a power unit as viewed in the same direction as FIG. 1.

As shown in the example of FIG. 2, the engine E may include a crankcase 19 in which a crankshaft 28 having an axis extending transversely of the motorcycle is rotatably supported. The engine E may also include a cylinder block 29 having a forwardly inclined cylinder axis C, coupled to a front upper end of the crankcase 19, a cylinder head 30 coupled to an upper end of the cylinder block 29, and a head cover 31 coupled to an upper end of the cylinder head 30. An oil pan 32 may be coupled to a lower portion of the crankcase 19.

As also shown in the example of FIG. 3, the crankcase 19 can include an upper case body 33 and a lower case body 34 which are separably coupled to each other across a parting plane 35. In an embodiment, the cylinder block 29 is integrally formed with the upper case body 33.

The cylinder block 29 may have a plurality of, for example two, cylinder bores 36 juxtaposed transversely of the motorcycle. The crankshaft 28, which extends along the direction in which the cylinder bores 36 are arranged, i.e., transversely of the motorcycle, is rotatably supported in the crankcase 19. In one embodiment, the crankcase 19 has first through third support walls 38, 39, 40 having respective bearing holes 37 through which the crankshaft 28 extends and in which the crankshaft 28 is supported. The support walls 38, 39, 40 may be arranged successively from one end (left end in FIG. 3) of the crankshaft 28 toward the other end (right end in FIG. 3) of the crankshaft 28. Crank chambers 41 which correspond individually to the cylinder bores 36 are defined between adjacent ones of the support walls, i.e., between the first and second support walls 38, 39 and between the second and third support walls 39, 40, along the axis of the crankshaft 28 in the crankcase 19. A transmission chamber 42 which is connected commonly to the crank chambers 41 is defined in a rear portion of the crankcase 19.

According to one embodiment, a left case cover which defines a generator chamber 45 between itself and the crankcase 19 is coupled to a left side surface of the crankcase 19. The generator chamber 45 may house therein a generator 47 including a rotor 48 fixed to the end of the crankshaft 28 which projects into the generator chamber 45 and a stator 49 surrounded by the rotor 48 and fixed to the left case cover 46.

As shown in the example of FIG. 2, a starter motor 50 may be fixedly disposed above the crankcase 19 and laterally covered by an upper end portion of the left case cover 46. A speed reducer gear train 51 for transmitting power from the stator motor 50 may include a driven gear 52 that is connected to the rotor 48 by a one-way clutch 53.

In an embodiment, a drive gear 78 is fixed to the crankshaft 28 closely to the first support wall 38 of the crankcase 19 within the crankcase 19. As shown in the example of FIG. 2, first and second balancers 79, 80, i.e., primary balancers, are rotatably supported in the crankcase 19. The first balancer 79 is disposed rearwardly and obliquely upwardly of the crankshaft 28, and the second balancer 80 is disposed forwardly and obliquely downwardly of the crankshaft 28. The first and second balancers 79, 80 have driven gears 81, 82, respectively, that are held in driven mesh with the drive gear 78.

In an embodiment, a right case cover 55 that defines a clutch chamber 54 between itself and the crankcase 19 is coupled to a right side surface of the crankcase 19. The transmission chamber 42 may house therein a gear transmission M including a main shaft 58 and a countershaft 59 that have respective axes parallel to the crankshaft 28 and rotatably supported in the crankcase 19 and a plurality of gear trains for gear positions, e.g., first through sixth gear trains G1 through G6, which can selectively be established, between the main shaft 58 and the countershaft 59. The clutch chamber 54 may house therein a primary speed reducer 60 for transmitting power from the crankshaft 28 and first and second hydraulic clutches 61, 62 interposed between the primary speed reducer 60 and the main shaft 58.

According to one embodiment, the countershaft 59 has an end rotatably supported on a right side wall of the crankcase 19 by a roller bearing 83 and the other end projecting from a rear left side surface of the crankcase 19 with a ball bearing 63 and an annular seal member 64 being interposed between itself an the crankcase 19.

As shown in the example of FIG. 1, rotational power output from the other end of the countershaft 59 is transmitted to the rear wheel WR by power transmitting means 65. The power transmitting means 65 includes a drive sprocket 66 fixed to the end of the countershaft 59, a driven sprocket 67 mounted coaxially on the rear wheel WR, and an endless chain 68 trained around the drive sprocket 66 and the driven sprocket 67.

According to an embodiment, a pulser 69 is fixed to the end of the crankshaft 28 in the clutch chamber 54. A rotational speed sensor 70 is disposed in the clutch chamber 54 in confronting relation to an outer circumferential portion of the pulser 69 and fixed to the right case cover 55.

The main shaft 58 may include a first shaft 71 and a second shaft 72 in which the first shaft 71 is coaxially and relatively rotatably inserted. The first gear train G1, the third gear train G3, and the fifth gear train G5 are provided between the first shaft 71 and the countershaft 59, and the second gear train G2, the fourth gear train G4, and the sixth gear train G6 are provided between the second shaft 72 and the counter shaft 59.

In one embodiment, the first shaft 71 may be smaller in diameter than the second shaft 72. The first shaft 71, which rotatably extends through the crankcase 19, has an end portion rotatably supported in the right case cover 55 by a first clutch inner member 91 and a ball bearing 75. The other end of the first shaft 71 is rotatably supported in the upper case body 33 of the crankcase 19 by a ball bearing 73. The second shaft 72, which is greater in diameter than the first shaft 71, has an axially intermediate portion rotatably supported in the crankcase 19 by a ball bearing 76. The first shaft 71 has an intermediate portion coaxially and relatively rotatably extending through the second shaft 72. A plurality of needle bearings 77 are interposed between the first shaft 71 and the second shaft 72.

Figure 4:
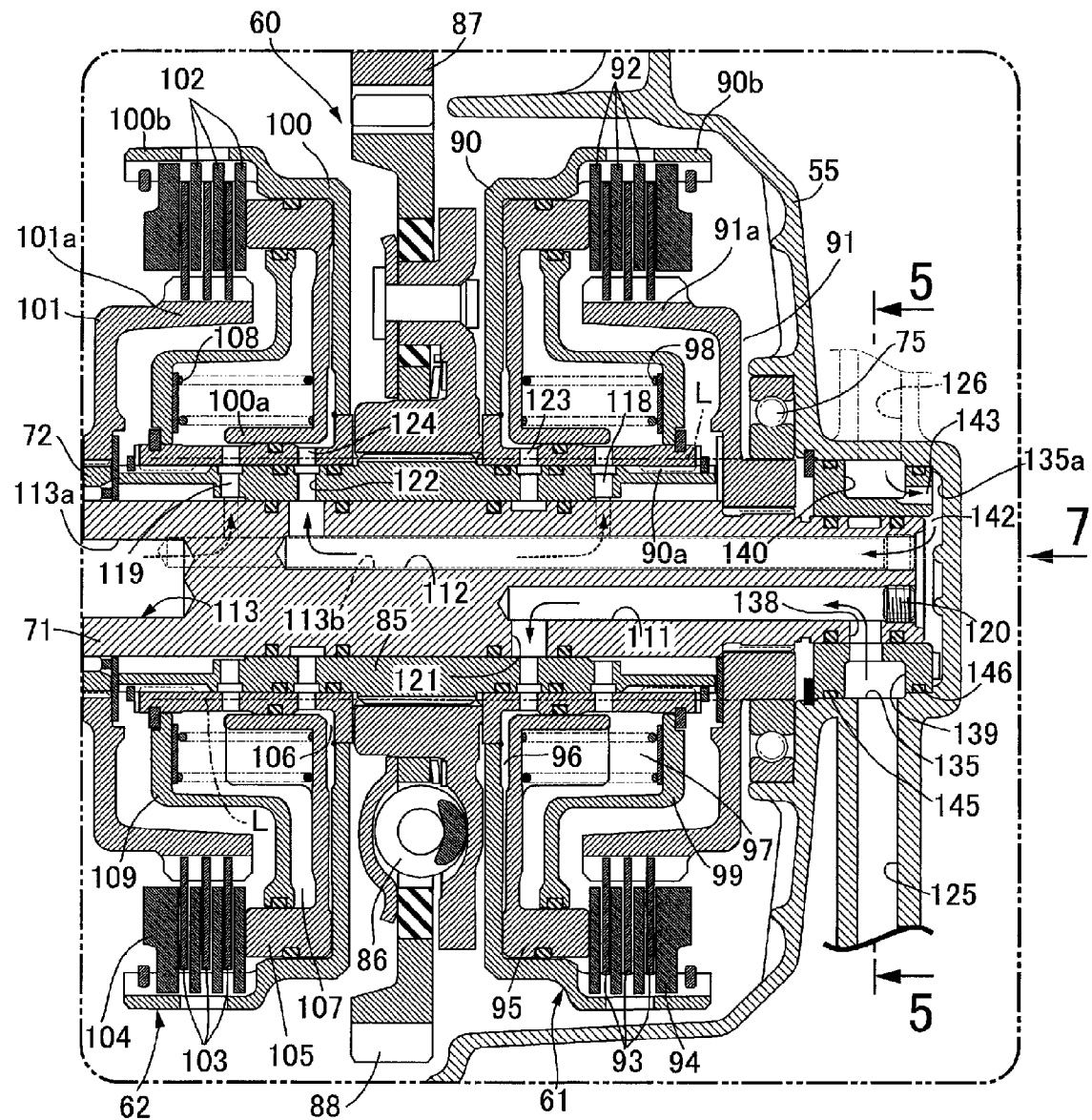
FIG. 4 is an enlarged view of a portion of FIG. 3, and a cross-sectional view taken along line 4-4 of FIG. 5.

As also shown in the example of FIG. 4, in an embodiment, a transmission tubular shaft 85 axially adjacent to the second shaft 72 is axially immovably and relatively rotatably mounted on an intermediate portion of the first shaft 71 closely to an end thereof. The first hydraulic clutch 61 is mounted on the first shaft for selectively transmitting and cutting off power between the transmission tubular shaft 85 and the first shaft 71. The second hydraulic clutch 62 is mounted on the first shaft 71 for selectively transmitting and cutting off power between the transmission tubular shaft 85 and the second shaft 72.

Power from the crankshaft 28 can be transmitted to the transmission tubular shaft 85 through the primary speed reducer 60 and a damper spring 86. The primary speed reducer 60 includes a drive gear 87 rotatable in unison with the crankshaft 28 and a driven gear 88 disposed coaxially with the first and second shafts 71, 72 and held in mesh with the drive gear 87. The driven gear 88 is connected to the transmission tubular shaft 85 by the damper spring 86.

According to one embodiment, the first hydraulic clutch 61 is disposed more closely to one axial end of the first shaft 71 than the primary speed reducer 60. The first hydraulic clutch 61 may include a first clutch outer member 90 in the form of a concentric double-walled bottomed hollow cylinder having a first tubular boss 90a coaxially surrounding the transmission tubular shaft 85 and a first outer tubular member 90b coaxially surrounding the first tubular boss 90a. The first clutch outer member 90 may be relatively nonrotatably coupled to the transmission tubular shaft 85. The first hydraulic clutch 61 may also include a first clutch inner member 91 having a first inner tubular member 91a coaxially surrounded by the first outer tubular member 90b. The first clutch inner member 91 being relatively nonrotatably coupled to the first shaft 71, with the ball bearing 75 being interposed between the first clutch inner member 91 and the right case cover 55. The first hydraulic clutch 61 may also include a plurality of first drive friction plates 92 relatively nonrotatably engaged by the first outer tubular member 90b of the first clutch outer member 90, a plurality of first driven friction plates 93 relatively nonrotatably engaged by the first inner tubular member 91a of the first clutch inner member 91 and alternating with the first drive friction plates 92, a first pressure bearing plate 94 fixedly supported by the first clutch outer member 90 in confronting relation to the first drive friction plates 92 and the first driven friction plates 93 alternating with each other, a first clutch piston 95 sandwiching the first drive friction plates 92 and the first driven friction plates 93 between itself and the first pressure bearing plate 94, the first clutch piston 95 and the first clutch outer member 90 defining a first control hydraulic pressure chamber 96 therebetween, and a first spring 98 for biasing the first clutch piston 95 in a direction to reduce the volume of the first control hydraulic pressure chamber 96.

According to one embodiment, the first clutch piston 95 has an inner circumferential surface held in fluid-tight sliding contact with the outer circumferential surface of the first boss 90a of the first clutch outer member 90 and an outer circumferential surface held in fluid-tight sliding contact with the first outer tubular member 90b of the first clutch outer member 90. In response to a hydraulic pressure buildup in the first control hydraulic chamber 96, the first clutch piston 95 operates to grip the first drive friction plates 92 and the first driven friction plates between itself and the first pressure bearing plate 94. This brings the first hydraulic clutch 61 into an engaged state wherein the first hydraulic clutch 61 transmits rotational power, which has been transmitted from the crankshaft 28 through the primary speed reducer 60, the damper spring 86, and the transmission tubular shaft 85, to the first clutch outer member 90, to the first shaft 71.

In an embodiment, a first canceler chamber 97 is defined between the first clutch piston 95 and a first wall member 99 opposite to the first control hydraulic chamber 96. The first wall member 99 has an inner circumferential portion supported on the first boss 90a of the first clutch outer member 90 and an outer circumferential portion with which the first clutch piston 95 is held in fluid-tight sliding contact. The first spring 98 is housed in the first canceler chamber 97 and interposed between the first clutch piston 95 and the first wall member 99. Lubricating oil is introduced into the first canceler chamber 97. Even when forces are generated to press the first clutch piston 95 under centrifugal forces upon rotation which act on oil in the first control hydraulic chamber 96 that is depressurized, since centrifugal forces also act on oil in the first canceler chamber 97, the first clutch piston 95 is prevented from being undesirably moved to grip the first drive friction plates 92 and the first driven friction plates 93 between itself and the first pressure bearing plate 94.

According to an embodiment, the second hydraulic clutch 62 is disposed more closely to the other end of the first shaft 71 than the first hydraulic clutch 61, with the primary speed reducer 60 being positioned between the first hydraulic clutch 61 and the second hydraulic clutch 62. The second hydraulic clutch 62 may include a second clutch outer member 100 in the form of a concentric double-walled bottomed hollow cylinder having a second tubular boss 100a coaxially surrounding the transmission tubular shaft 85 and a second outer tubular member 100b coaxially surrounding the second tubular boss 100a. The second clutch outer member 100 is relatively nonrotatably coupled to the transmission tubular shaft 85. The second hydraulic clutch 62 may also include a second clutch inner member 101 having a second inner tubular member 101a coaxially surrounded by the second outer tubular member 100b. The second clutch inner member 101 is relatively nonrotatably coupled to the second shaft 72. The second hydraulic clutch 62 may further include a plurality of second drive friction plates 102 relatively nonrotatably engaged by the second outer tubular member 100b of the second clutch outer member 100, a plurality of second driven friction plates 103 relatively nonrotatably engaged by the second inner tubular member 101a of the second clutch inner member 101 and alternating with the second drive friction plates 102, a second pressure bearing plate 104 fixedly supported by the second clutch outer member 100 in confronting relation to the second drive friction plates 102 and the second driven friction plates 103 alternating with each other, a second clutch piston 105 sandwiching the second drive friction plates 102 and the second driven friction plates 103 between itself and the second pressure bearing plate 104, the second clutch piston 105 and the second clutch outer member 100 defining a second control hydraulic pressure chamber 106 therebetween, and a second spring 108 for normally biasing the second clutch inner member 101 in a direction to reduce the volume of the second control hydraulic pressure chamber 106.

In an embodiment, the second clutch piston 105 has an inner circumferential surface held in fluid-tight sliding contact with the outer circumferential surface of the second boss 100a of the second clutch outer member 100, and an outer circumferential surface held in fluid-tight sliding contact with the second outer tubular member 100b of the second clutch outer member 100. In response to a hydraulic pressure buildup in the second control hydraulic chamber 106, the second clutch piston 105 operates to grip the second drive friction plates 102 and the second driven friction plates 103 between itself and the second pressure bearing plate 104. This brings the second hydraulic clutch 62 into an engaged state wherein the second hydraulic clutch 62 transmits rotational power, which has been transmitted from the crankshaft 28 through the primary speed reducer 60, the damper spring 86, and the transmission tubular shaft 85 to the second clutch outer member 100, to the second shaft 72.

According to one embodiment, a second canceler chamber 107 is defined between the second clutch piston 105 and a second wall member 109 opposite to the second control hydraulic chamber 106. The second wall member 109 has an inner circumferential portion supported on the second boss 100a of the second clutch outer member 100 and an outer circumferential portion with which the second clutch piston 105 is held in fluid-tight sliding contact. The second spring 108 may be housed in the second canceler chamber 107 and interposed between the second clutch piston 105 and the second wall member 109. Lubricating oil is introduced into the second canceler chamber 107. Even when forces are generated to press the second clutch piston 105 under centrifugal forces upon rotation which act on oil in the second control hydraulic chamber 106 that is depressurized, since centrifugal forces also act on oil in the second canceler chamber 107, the second clutch piston 105 is prevented from being undesirably moved to grip the second drive friction plates 102 and the second driven friction plates 103 between itself and the second pressure bearing plate 104.

According to an embodiment, when the first hydraulic clutch 61 is in a power transmitting state and is transmitting power from the crankshaft 28 to the first shaft 71, it is possible to transmit the power from the first shaft 71 to the countershaft 59 through a selectively established one of the first, third, and fifth gear trains G1, G3, G5. When the second hydraulic clutch 62 is in a power transmitting state and is transmitting power from the crankshaft 28 to the second shaft 72, it is possible to transmit the power from the second shaft 72 to the countershaft 59 through a selectively established one of the second, fourth, and sixth gear trains G2, G4, G6.

Figure 5:
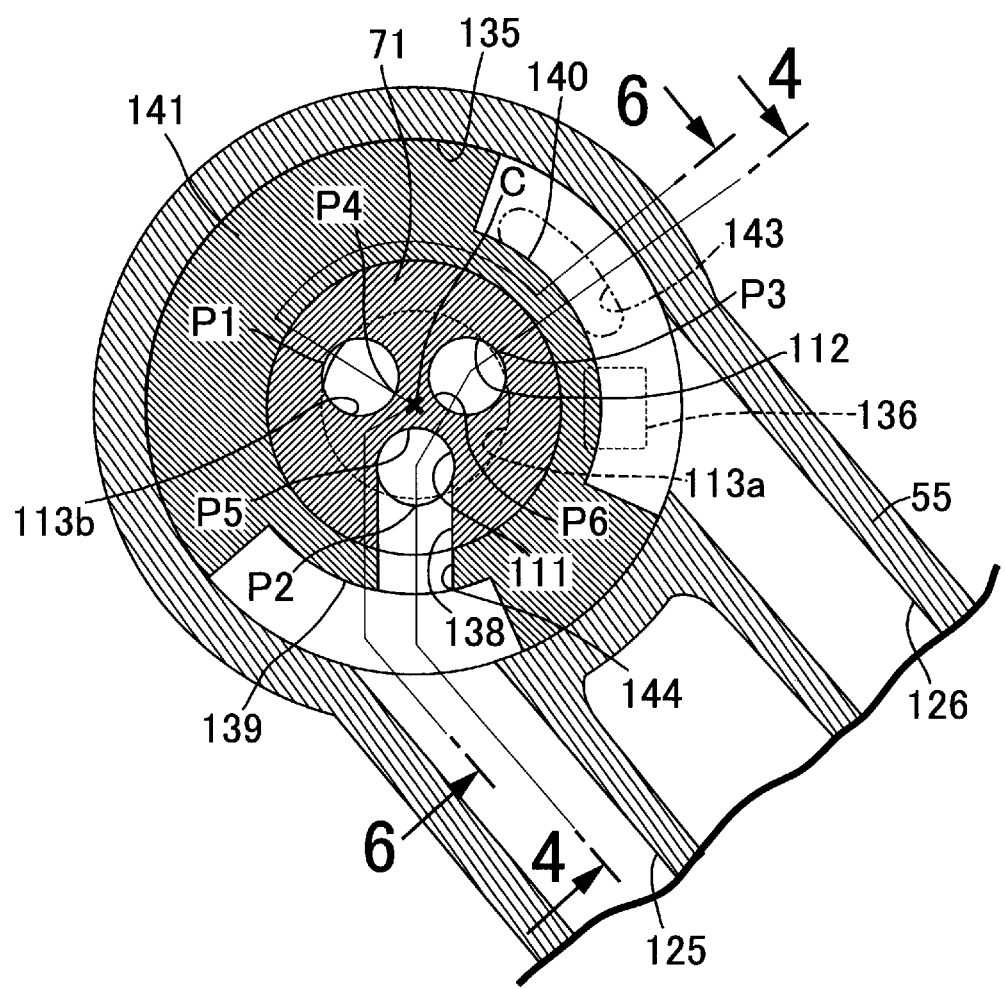
FIG. 5 is a cross-sectional view taken along line 5-5 of FIG. 4.
Figure 6:
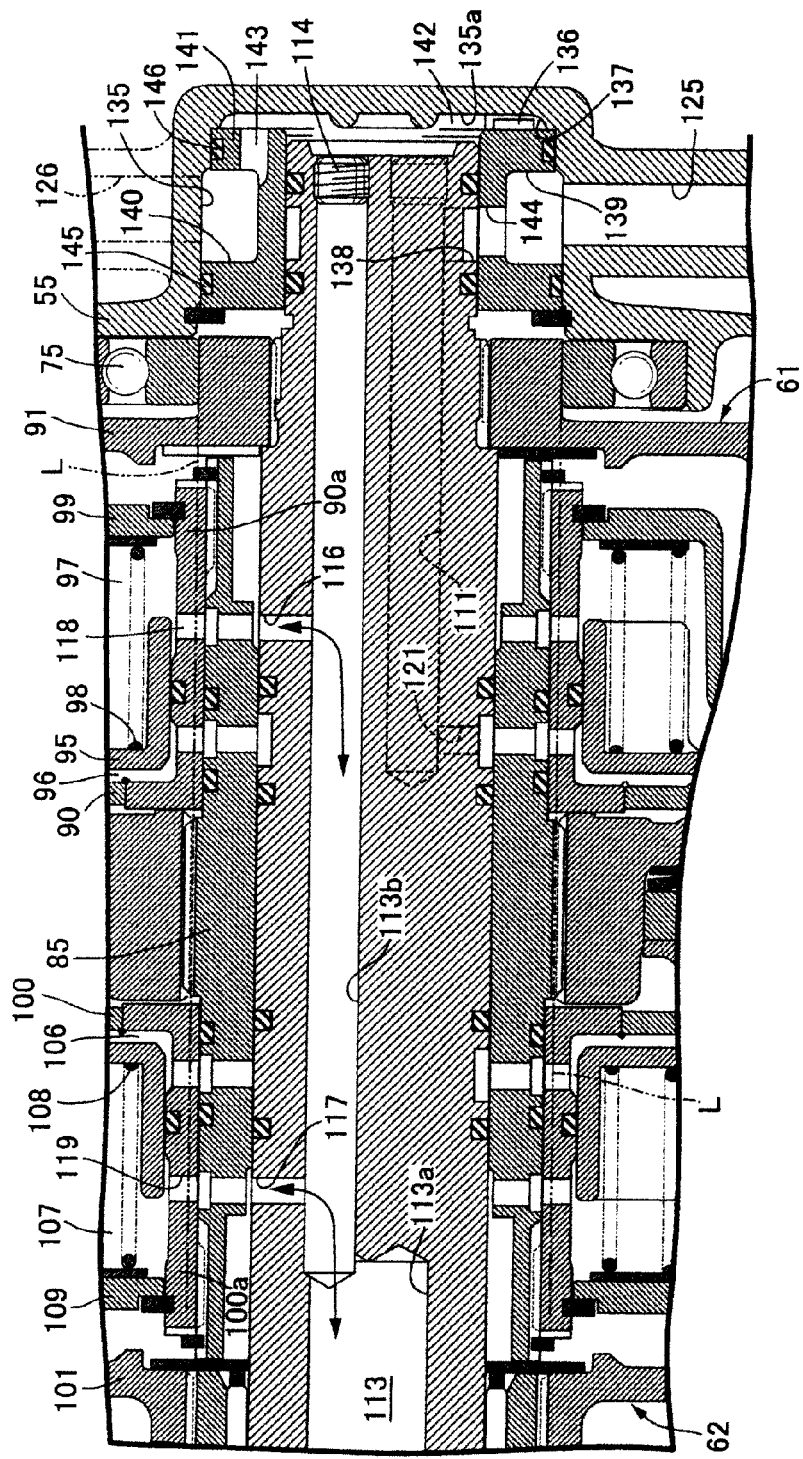
FIG. 6 is a cross-sectional view taken along line 6-6 of FIG. 5.

As also shown in the examples of FIGS. 5 and 6, the first shaft 71 has a first control oil passage 111 defined therein which is connected to the first control hydraulic pressure chamber 96 of the first hydraulic clutch 61, a second control oil passage 112 defined therein which is connected to the second control hydraulic pressure chamber 106 of the second hydraulic clutch 62, and a lubricating oil passage 113 defined therein for supplying lubricating oil to lubricated parts around the first shaft 71. The lubricating oil passage 113 is connected to the first and second canceler chambers 97, 107 of the respective first and second hydraulic clutches 61, 62.

The lubricating oil passage 113 is supplied with lubricating oil from the other end of the first shaft 71. The lubricating oil passage 113 may include an upstream oil passage 113a defined coaxially in the first shaft 71 for supplying lubricating oil to lubricated parts around the first shaft 71, and a downstream oil passage 113b connected to the upstream oil passage 113a for supplying lubricating oil from the upstream oil passage 113a to the first and second canceler chambers 97, 107. In an embodiment, the downstream oil passage 113b may be smaller in diameter than the upstream oil passage 113a and have at least a portion extending parallel to the axis of the first shaft 71. According to one embodiment, the downstream oil passage 113b, which has the same diameter as the first and second control oil passages 111, 112, is defined in the first shaft 71 parallel to the axis of the first shaft 71 and connected to the upstream oil passage 113a.

The upstream oil passage 113a may be drilled axially into the other end of the first shaft 71 such that its outer end is opens at the other end of the first shaft 71. The upstream oil passage 113a has an inner end disposed at a position which is aligned, as viewed in side elevation, with the second hydraulic clutch 62, among the first and second hydraulic clutches 61, 62 that are juxtaposed in a direction along the axis of the first shaft 71. The downstream oil passage 113b may be drilled axially into the one end portion of the first shaft 71 such that it is connected to the inner end of the upstream oil passage 113a. The downstream oil passage 113b has its outer end closed by a plug 114.

In one embodiment, the first shaft 71 has a plurality of oil holes 115 defined therein at axially spaced locations for supplying lubricating oil to lubricated parts around the first shaft 71, e.g., a plurality of locations in the gear transmission M and parts between the first and second shafts 71, 72, in the present embodiment. The oil holes 115 may have inner ends connected to the upstream oil passage 113a of the lubricating oil passage 113. The first shaft 71 may also have a first canceler chamber oil hole 116 defined therein for introducing lubricating oil into the first canceler chamber 97 of the first hydraulic clutch 61 and a second canceler chamber oil hole 117 for introducing lubricating oil into the second canceler chamber 107 of the second hydraulic clutch 62. The first and second canceler chamber oil holes 116, 117 may have inner ends connected to the downstream oil passage 113b of the lubricating oil passage 113. The first canceler chamber oil hole 116 can be held in fluid communication with the first canceler chamber 97 through a joint hole 118 that is defined in the transmission tubular shaft 85 and the first boss 90a of the first clutch outer member 90. The second chamber oil hole 117 can be held in fluid communication with the second canceler chamber 107 through a joint hole 119 that is defined in the transmission tubular shaft 85 and the second boss 100a of the second clutch outer member 100.

In an embodiment, the first and second control oil passages 111, 112 are defined in the first shaft 71 such that at least a portion of the first and second control oil passages 111, 112 is disposed in a range wherein the downstream oil passage 113b is provided in a direction along the axis of the first shaft 71. The first control oil passage 111 may be drilled axially into the one end portion of the first shaft 71 and has an outer end closed by a plug 120 that is press-fitted into the first shaft 71. The second control oil passage 112 may be drilled axially into the one end portion of the first shaft 71 and has an open outer end.

As shown in the example of FIG. 5, the first control oil passage 111, the second control oil passage 112, and the downstream oil passage 113b of the lubricating oil passage 113 are defined in the first shaft 71 such that they are disposed at a position wherein they are partly superposed on the upstream oil passage 113a on a projection onto a plane perpendicular to the axis of the first shaft 71. In an embodiment, the first control oil passage 111, the second control oil passage 112, and the downstream oil passage 113b of the lubricating oil passage 113 are disposed at equal intervals in the circumferential direction of the first shaft 71.

The downstream oil passage 113b, the first control oil passage 111, and the second control oil passage 112 have respective outer ends P1, P2, P3 along radial directions of the first shaft 71 which are disposed outwardly of the inner circumferential surface of the upstream oil passage 113a. The downstream oil passage 113b, the first control oil passage 111, and the second control oil passage 112 have respective inner ends P4, P5, P6 along radial directions of the first shaft 71 which are disposed outwardly of the central axis C of the upstream oil passage 113a.

According to an embodiment, the first shaft 71 has a first control hydraulic pressure chamber oil hole 121 defined therein for guiding control oil into the first control hydraulic pressure chamber 96 of the first hydraulic clutch 61 and having an inner end connected to the first control oil passage 111. The first shaft 71 may also have a second control hydraulic pressure chamber oil hole 122 defined therein for guiding control oil into the second control hydraulic pressure chamber 106 of the second hydraulic clutch 62 and having an inner end connected to the second control oil passage 112. The first control hydraulic pressure chamber oil hole 121 can be held in fluid communication with the first control hydraulic pressure chamber 96 through a joint hole 123 that is defined in the transmission tubular shaft 85 and the first boss 90a of the first clutch outer member 90. The second control hydraulic pressure chamber oil hole 122 can be held in fluid communication with the second control hydraulic pressure chamber 106 through a joint hole 124 that is defined in the transmission tubular shaft 85 and the second boss 100a of the second clutch outer member 100.

Figure 7:
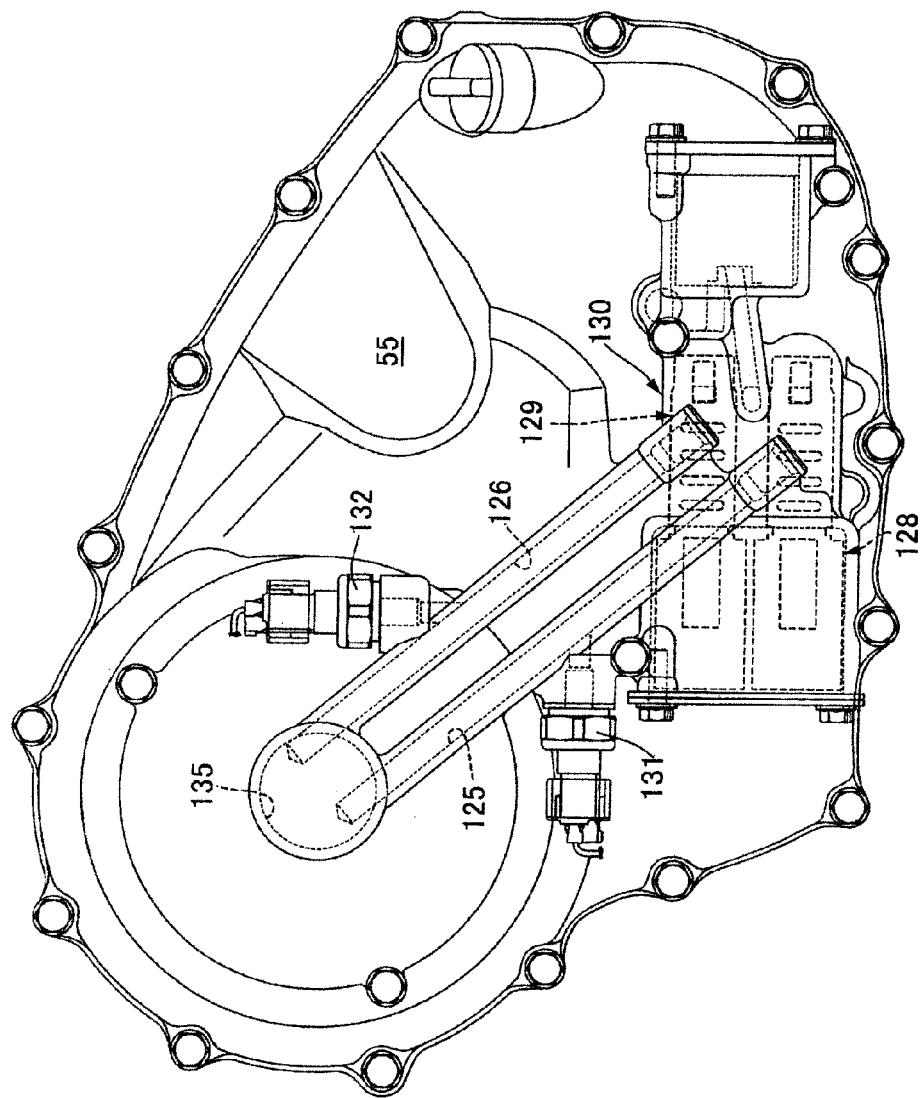
FIG. 7 is a view taken in the direction of arrow 7 in FIG. 4.

As also shown in the example of FIG. 7, control oil is introduced from the right case cover 55 into the first and second control oil passages 111, 112. The right case cover 55 has a first supply oil passage 125 connected to the first control oil passage 111 and a second supply oil passage 126 connected to the second control oil passage 112.

As shown in the example of FIG. 2, an oil pump 127, which may serve as an oil supply source, is relatively nonrotatably connected to the second balancer and is mounted on the lower case body 34 of the crankcase 19. A hydraulic pressure control unit 130, which includes a unitized assembly of a first hydraulic pressure control valve 128 interposed between the first supply oil passage 125 and the oil pump 127 and a second hydraulic pressure control valve 129 interposed between the second supply oil passage 126 and the oil pump 127, is mounted on a lower portion of the right case cover 55.

A first hydraulic pressure sensor 131 for detecting a hydraulic pressure in the first supply oil passage 125, and a second hydraulic pressure sensor 132 for detecting a hydraulic pressure in the second supply oil passage 126 are mounted on the right case cover 55.

According to one embodiment, a cavity 135 having a closed end wall 135a facing the one end portion of the first shaft 71 and receiving the one end portion of the first shaft 71 therein is defined in an inner surface of the right case cover 55 such that the first and second supply oil passages 125, 126 are open at inner circumferential surfaces of the cavity 135. In an embodiment, to keep the first shaft 71 in a constant circumferential position in the cavity 135, a positioning tooth 136 projecting from the one end of the first shaft engages in a positioning recess 137 defined in a circumferential position in the cavity 135.

One of the first and second control oil passages 111, 112 may be referred to as one particular control oil passage (for example, in the present embodiment, the second control oil passage 112), and the other as another control oil passage. The first shaft 71 has at least one radial joint hole 138 defined in the one end thereof and extending radially of the first shaft 71. The radial joint hole 138 may have an inner end connected to the first control oil passage 111 which serves the other control oil passage. The radial joint hole 138 is connected to the first supply oil passage 125, which is a corresponding one of the first and second supply oil passages 125, 126, in the cavity 135.

According to an embodiment, a cylindrical tubular member 141 is interposed between the outer circumferential surface of the one end portion of the first shaft 71 and the inner circumferential surface of the cavity 135. The cylindrical tubular member 141 has first and second oil passage forming recesses 139, 140 defined in outer circumferential surfaces thereof independently of each other and connected individually to the first and second supply oil passages 125, 126. The cylindrical tubular member 141 is disposed inwardly of the inner circumferential surfaces of the first and second clutch pistons 95, 105 of the respective first and second hydraulic clutches 61, 62 on a projection onto a plane perpendicular to the axis of the first shaft 71. Specifically, if imaginary extensions of the outer circumferential surface of the cylindrical tubular member 141 toward the first and second hydraulic clutches 61, 62 are indicated by chain lines L in FIGS. 4 and 6, then the chain lines L extend inwardly of the inner circumferential surfaces of the first and second clutch pistons 95, 105.

In an embodiment, an oil chamber 142 that is connected to the second control oil passage 112 is defined between the closed end wall 135a of the cavity 135, the end of the first shaft 71, and an end of the cylindrical tubular member 141. The cylindrical tubular member 141 may have an axial oil hole 143 defined therein which extends axially thereof and allowing the second oil passage forming recess 140, which is one of the first and second oil passage forming recesses 139, 140, to be connected to the oil chamber 142, and a radial oil hole 144 defined therein which extends radially thereof and allowing the first oil passage forming recess 139, which is the other of the first and second oil passage forming recesses 139, 140, to be connected to the radial joint hole 138. According to an embodiment, the axial oil hole 143 may be shaped as an oblong hole which is long in the circumferential direction of the cylindrical tubular member 141.

A pair of annular seal members 145, 146 may be mounted on the outer circumferential surface of the cylindrical tubular member 141 and held in elastic contact with the inner circumferential surface of the cavity 135 for sealing the opposite sides of the region where the first and second oil passage forming recesses 139, 140 and the first and second supply oil passages 125, 126 are connected to each other.

Advantages of the embodiments discussed above will be described below. The first and second hydraulic clutches 61, 62 are mounted on the first shaft 71 which serves as part of the main shaft 58 and which is rotatably supported in the crankcase 19. The first shaft 71 has the first control oil passage 111 defined therein for supplying control oil to the first control hydraulic pressure chamber 96 of the first hydraulic clutch 61, the second control oil passage 112 defined therein for supplying control oil to the second control hydraulic pressure chamber 106 of the second hydraulic clutch 62, and the lubricating oil passage 113 defined therein for supplying lubricating oil to the first and second canceler chambers 97, 107 of the respective first and second hydraulic clutches 61, 62 and lubricated parts around the first shaft 71. The lubricating oil passage 113 includes the upstream oil passage 113a defined coaxially in the first shaft 71 for supplying lubricating oil to lubricated parts around the first shaft 71, and the downstream oil passage 113b connected to the upstream oil passage 113a for supplying lubricating oil from the upstream oil passage 113a to the first and second canceler chambers 97, 107, the downstream oil passage 113b being smaller in diameter than the upstream oil passage 113a. Therefore, a portion of the lubricating oil passage 113 which supplies lubricating oil to the lubricated parts can be increased in diameter for supplying a sufficient amount of lubricating oil to the lubricated parts.

In one embodiment, the downstream oil passage 113b connected to the upstream oil passage 113a extends parallel to the axis of the first shaft 71, and at least a portion of the first and second control oil passages 111, 112 which have axes parallel to the downstream oil passage 113b is disposed in a range wherein the downstream oil passage 113b is provided in the direction along the axis of the first shaft 71. Therefore, the lubricating oil passage 113 and the first and second control oil passages 111, 112 can be arranged in a compact layout.

According to an embodiment, the first and second control oil passages 111, 112 which are connected individually to the first and second control hydraulic pressure chambers 96, 106 of the first and second hydraulic clutches 61, 62 which are juxtaposed along the axis of the first shaft 71, and the downstream oil passage 113b are disposed at a position wherein they are partly superposed on the upstream oil passage 113a on a projection onto a plane perpendicular to the axis of the first shaft 71. Therefore, the lubricating oil passage 113 and the first and second control oil passages 111, 112 can be defined in a compact layout in the first shaft 71.

In an embodiment, since the first and second control oil passages 111, 112 and the downstream oil passage 113b are disposed at equal intervals in the circumferential direction of the first shaft 71, the first and second control oil passages 111, 112 and the downstream oil passage 113b can be disposed in a well-balanced fashion in the first shaft 71 while maintaining the rigidity of the first shaft 71 between the first and second control oil passages 111, 112 and the downstream oil passage 113b. As the first control oil passage 111, the second control oil passage 112, and the downstream oil passage 113b are of the same diameter, they can easily be machined in the first shaft 71 for higher machinability.

According to one embodiment, the downstream oil passage 113b, the first control oil passage 111, and the second control oil passage 112 have respective outer ends P1, P2, P3 along radial directions of the first shaft 71 which are disposed outwardly of the inner circumferential surface of the upstream oil passage 113a. The downstream oil passage 113b, the first control oil passage 111, and the second control oil passage 112 have respective inner ends P4, P5, P6 along radial directions of the first shaft 71 which are disposed outwardly of the central axis C of the upstream oil passage 113a. Therefore, the downstream oil passage 113b, the first control oil passage 111, and the second control oil passage 112 can be arranged in a compact layout without mutual physical interference.

In an embodiment, the downstream oil passage 113b which is drilled together with the first and second control oil passages 111, 112 axially into the one end of the first shaft 71 is connected to the upstream oil passage 113a which is drilled axially into the other end of the first shaft 71. Consequently, the first control oil passage 111, the second control oil passage 112, and the downstream oil passage 113b can be drilled more easily than if they are drilled into the opposite ends of the first shaft 71.

In an embodiment, the upstream oil passage 113a of the lubricating oil passage 113 extends from the axially other end of the first shaft 71 and has an inner end disposed at a position which is aligned, as viewed in side elevation, with the second hydraulic clutch 62, among the first and second hydraulic clutches 61, 62 that are juxtaposed in a direction along the axis of the first shaft 71, the first hydraulic clutch 61 being disposed closely to the one end of the first shaft 71 along the axis thereof and the second hydraulic clutch 62 being disposed more closely to the other end of the first shaft 71 along the axis thereof than the first hydraulic clutch 61. Therefore, the upstream oil passage 113a can be made longer and can supply lubricating oil more smoothly to the lubricated parts than if the inner end of the upstream oil passage 113a is positioned more closely to the other end of the first shaft 71 than the second hydraulic clutch 62.

According to an embodiment, the first and second control oil passages 111, 112 are connected individually to the first and second control hydraulic pressure chambers 96, 106 of the first and second hydraulic clutches 61, 62. The engine E which incorporates a twin-clutch mechanism including the first and second hydraulic clutches 61, 62 can thus be made compact along the axis of the first shaft 71.

In an embodiment, the first and second control oil passages 111, 112 are supplied with control oil from the first and second supply oil passages 125, 126 that are defined in the right case cover 55 for guiding oil from the oil pump 127. The cavity 135 having the closed end wall 135a facing the one end portion of the first shaft 71 and receiving the one end portion of the first shaft 71 therein is defined in the inner surface of the right case cover 55 such that the first and second supply oil passages 125, 126 are open at inner circumferential surfaces of the cavity 135. Of the first and second control oil passages 111, 112, the second control oil passage 112 may be referred to as one control oil passage, and the first control oil passage 111 may be referred to as another control oil passage. The first shaft 71 has the radial joint hole 138 defined in the one end thereof and extending radially of the first shaft 71, the radial joint hole 138 having an inner end connected to the first control oil passage 111 which serves the other control oil passage. The radial joint hole 138 is connected to the first supply oil passage 125 in the cavity 135.

Accordingly, the engine E can be made more compact along the axis of the first shaft 71 than if a plurality of pipes are disposed between the first shaft and the right case cover 55 for providing the first and second control oil passages 111, 112.

According to one embodiment, the cylindrical tubular member 141 is interposed between the outer circumferential surface of the one end portion of the first shaft 71 and the inner circumferential surface of the cavity 135. The cylindrical tubular member 141 has the first and second oil passage forming recesses 139, 140 defined in the outer circumferential surfaces thereof independently of each other and connected individually to the first and second supply oil passages 125, 126. The oil chamber 142 that is connected to the second control oil passage 112 is defined between the closed end wall 135a of the cavity 135, the end of the first shaft 71, and the end of the cylindrical tubular member 141. The cylindrical tubular member 141 has the axial oil hole 143 defined therein which extends axially thereof and allowing the second oil passage forming recess 140, which is one of the first and second oil passage forming recesses 139, 140, to be connected to the oil chamber 142, and the radial oil hole 144 defined therein which extends radially thereof and allowing the first oil passage forming recess 139, which is the other of the first and second oil passage forming recesses 139, 140, to be connected to the radial joint hole 138. Therefore, the first and second supply oil passages 125, 126 defined in the right case cover 55 and the first and second control oil passages 111, 112 defined in the first shaft 71 are connected to each other by a structure which can be made compact.

In an embodiment, the cylindrical tubular member 141 is disposed inwardly of the inner circumferential surfaces of the first and second clutch pistons 95, 105 of the respective first and second hydraulic clutches 61, 62 on a projection onto a plane perpendicular to the axis of the first shaft 71. Consequently, the right case cover 55 is prevented from being increased in size by the cylindrical tubular member 141.

According to one embodiment, the axial oil hole 143 defined in the cylindrical tubular member 141 is shaped as an oblong hole which is long in the circumferential direction of the cylindrical tubular member 141. Compared to an axial oil hole 143 which is shaped as a circular hole, the cylindrical tubular member 141 is prevented from being increased in diameter, the axial oil hole 143 is increased in cross-sectional area, and oil flows more smoothly from the second oil passage forming recess 140 which is one of the first and second oil passage forming recesses 139, 140 that are defined in the outer circumferential surface of the cylindrical tubular member 141 to the oil chamber 142.

In an embodiment, the pair of annular seal members 145, 146 are mounted on the outer circumferential surface of the cylindrical tubular member 141 seal the opposite sides of the region where the first and second oil passage forming recesses 139, 140 and the first and second supply oil passages 125, 126 are connected to each other. Therefore, oil flowing from the first and second supply oil passages 125, 126 through the cylindrical tubular member 141 into the first and second control oil passages 111, 112 is prevented from leaking.

In one embodiment, the plug 120 is press-fitted into the one end of the first shaft 71 in the cavity 135 to close the axial end of the first control oil passage 111. Therefore, the first control oil passage 111 and the oil chamber 142 are simply blocked from each other.

Figure 8:
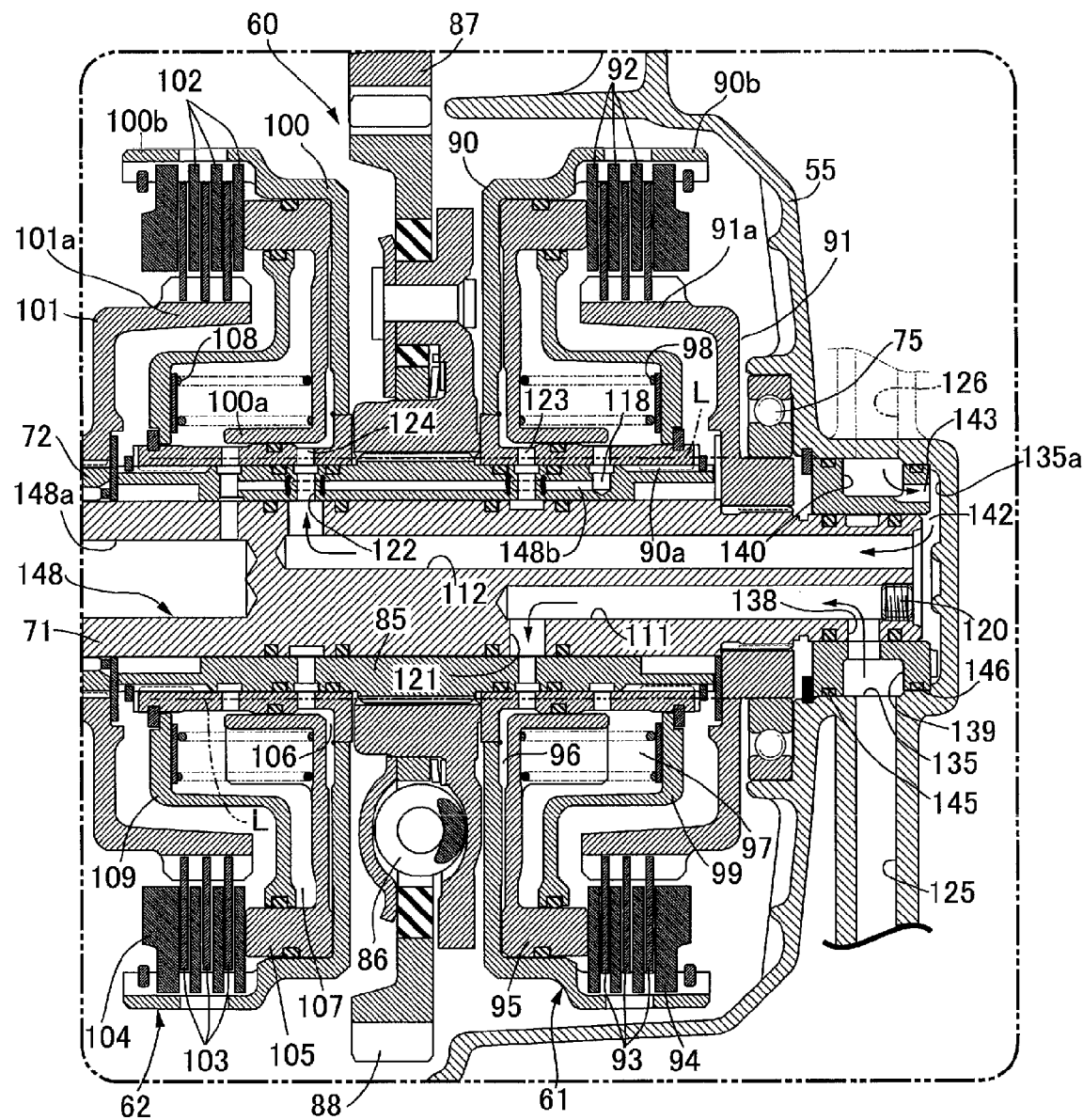
FIG. 8 is a cross-sectional view corresponding to FIG. 4, according to another embodiment.

Other embodiments of the present invention will be described below with reference to FIG. 8. Those parts of the embodiments discussed below which correspond to those of the above-discussed embodiments are denoted by identical reference characters, and will not be described in detail below.

In an embodiment, a first shaft 71 has a first control oil passage 111 defined therein which is connected to a first control hydraulic pressure chamber 96 of a first hydraulic clutch 61, and a second control oil passage 112 defined therein which is connected to a second control hydraulic pressure chamber 106 of a second hydraulic clutch 62. A lubricating oil passage 148 for supplying lubricating oil to lubricated parts around the first shaft 71 is connected to first and second canceler chambers 97, 107 of the respective first and second hydraulic clutches 61, 62.

The lubricating oil passage 148 may include an upstream oil passage 148a defined coaxially in the first shaft 71 for supplying lubricating oil to lubricated parts around the first shaft 71, and a downstream oil passage 148b connected to the upstream oil passage 148a for supplying lubricating oil to the first and second canceler chambers 97, 107. According to one embodiment, the downstream oil passage 148b may be smaller in diameter than the upstream oil passage 148a and have at least a portion extending parallel to the axis of the first shaft 71. At least a portion of the downstream oil passage 148b is defined in a cylindrical transmission tubular shaft 85 which coaxially surrounds the first shaft 71 and extends parallel to the axis of the first shaft 71.

In an embodiment, the first and second control oil passages 111, 112 are defined in the first shaft 71 such that at least a portion of the first and second control oil passages 111, 112 is disposed in a range wherein the downstream oil passage 148b is provided in the direction along the axis of the first shaft 71.

According to this embodiment, since at least a portion of the downstream oil passage 148b is defined in the cylindrical transmission tubular shaft 85 which coaxially surrounds the first shaft 71, the first and second control oil passages 111, 112 that are defined in the first shaft 71 can be made larger in diameter.

According to one embodiment, the lubricating oil passage includes an upstream oil passage defined coaxially in the rotational shaft for supplying lubricating oil to the lubricated parts around the rotational shaft, and a downstream oil passage connected to the upstream oil passage for supplying lubricating oil from the upstream oil passage to the canceler chamber. The downstream oil passage being smaller in diameter than the upstream oil passage. As a result, at least a portion of the lubricating oil passage which supplies lubricating oil to the lubricated parts can be increased in diameter for supplying a sufficient amount of lubricating oil to the lubricated parts. Furthermore, at least a portion of the downstream oil passage connected to the upstream oil passage extends parallel to the axis of the rotational shaft, and the control oil passage which has an axis parallel to the axis of the rotational shaft is defined in the rotational shaft such that at least a portion of the control oil passage is disposed in a range wherein the downstream oil passage is provided in the direction along the axis of the rotational shaft. Therefore, the lubricating oil passage and the control oil passage can be arranged in a compact layout.

According to another embodiment, since a plurality of the control oil passages which are connected individually to a plurality of the control hydraulic pressure chambers of a plurality of the hydraulic clutches which are juxtaposed along the axis of the rotational shaft, and the downstream oil passage are defined in the rotational shaft such that a plurality of the control oil passages and the downstream oil passage are disposed at a position wherein a plurality of the control oil passages and the downstream oil passage are partly superposed on the upstream oil passage on a projection onto a plane perpendicular to the axis of the rotational shaft, the lubricating oil passage and a plurality of the control oil passages can be defined in a compact layout in the rotational shaft.

According to an embodiment, since a plurality of the control oil passages and the downstream oil passage are disposed at equal intervals in a circumferential direction of the rotational shaft, the control oil passages and the downstream oil passage can be disposed in a well-balanced fashion in the rotational shaft while maintaining the rigidity of the rotational shaft between the control oil passages and the downstream oil passage.

According to another embodiment, since the downstream oil passage and the control oil passages have the same diameters, they can easily be machined, thereby enhancing the machinability.

According to another embodiment, since the downstream oil passage and the control oil passages have respective outer ends along a radial direction of the rotational shaft which are disposed outwardly of an inner circumferential surface of the upstream oil passage, and respective inner ends along the radial direction of the rotational shaft which are disposed outwardly of a central axis of the upstream oil passage, the downstream oil passage and the control oil passages can be arranged in a compact layout without mutual physical interference.

According to another embodiment, since the control oil passages and the downstream oil passage are drilled axially into one end of the rotational shaft, and the upstream oil passage is drilled axially into the other end of the rotational shaft, the control oil passages and the downstream oil passage can be drilled more easily than if they are drilled into the opposite ends of the rotational shaft.

According to another embodiment, since a first hydraulic clutch and a second hydraulic clutch are mounted on the rotational shaft such that the first hydraulic clutch is disposed closer to one end of the rotational shaft along the axis thereof, and that the second hydraulic clutch is disposed closer to the other end of the rotational shaft than the first hydraulic clutch, and the upstream oil passage of the lubricating oil passage extends from the other axial end of the rotational shaft such that the upstream oil passage has an inner end disposed at a position which is aligned, as viewed in side elevation, with the second hydraulic clutch, the upstream oil passage can be made longer and can supply lubricating oil more smoothly to the lubricated parts than if the inner end of the upstream oil passage is positioned more closely to the other end of the rotational shaft than the second hydraulic clutch.

According to another embodiment, since at least a portion of the downstream oil passage is defined in a cylindrical tubular shaft which coaxially surrounds the rotational shaft, the control oil passage defined in the rotational shaft can be made larger in diameter.

While the embodiments of the present invention have been described above, the present invention is not limited to the above embodiments, but various changes in design can be made thereto without departing from the scope of the claims.

DESCRIPTION OF REFERENCE SYMBOLS

19 ... Crankcase
28 ... Crankshaft
61 ... First hydraulic clutch
62 ... Second hydraulic clutch
71 ... First shaft as rotational shaft
85 ... Transmission tubular shaft as tubular shaft
95, 105 ... Clutch piston
96, 106 ... Control hydraulic pressure chamber
97, 107 ... Canceler chamber
111, 112 ... Control oil passage
113, 148 ... Lubricating oil passage
113a, 148a ... Upstream oil passage
113b, 148b ... Downstream oil passage
E ... Engine

We claim:

1. A hydraulic clutch for an engine, the hydraulic clutch being disposed on a rotational shaft having an axis parallel to a crankshaft and rotatably supported in a crankcase, the hydraulic clutch comprising:
   a clutch piston configured to selectively switch between an engaged state and a disengaged state in response to axial movement thereof, wherein said clutch piston comprises opposite surfaces facing a control hydraulic pressure chamber and a canceler chamber, respectively;
   at least one control oil passage connected to said control hydraulic pressure chamber; and
   a lubrication oil passage, connected to said canceler chamber, configured to supply lubricating oil to lubricated parts around said rotational shaft, wherein said lubricating oil passage comprises an upstream oil passage defined coaxially in said rotational shaft configured to supply lubricating oil to the lubricated parts around the rotational shaft, and a downstream oil passage connected to said upstream oil passage configured to supply lubricating oil from said upstream oil passage to said canceler chamber,
   wherein said downstream oil passage is smaller in diameter than said upstream oil passage and has at least a portion extending parallel to the axis of said rotational shaft, and
   wherein said control oil passage has an axis parallel to the axis of said rotational shaft and is defined in said rotational shaft such that at least a portion of said control oil passage is disposed in a range wherein said downstream oil passage is provided in a direction along the axis of said rotational shaft.

2. The hydraulic clutch according to claim 1, wherein a plurality of said control oil passages and said downstream oil passage are connected individually to a plurality of said control hydraulic pressure chambers which are juxtaposed along the axis of said rotational shaft are defined in said rotational shaft such that said control oil passages and said downstream oil passage are disposed at a position wherein said control oil passages and said downstream oil passage are partly superposed on said upstream oil passage on a projection onto a plane perpendicular to the axis of said rotational shaft.

3. The hydraulic clutch according to claim 2, wherein said control oil passages and said downstream oil passage are disposed at equal intervals in a circumferential direction of said rotational shaft.

4. The hydraulic clutch according to claim 2, wherein said downstream oil passage and said control oil passages have same diameters.

5. The hydraulic clutch according to claim 2, wherein said downstream oil passage and said control oil passages have respective outer ends along a radial direction of said rotational shaft which are disposed outwardly of an inner circumferential surface of said upstream oil passage, and respective inner ends along the radial direction of said rotational shaft which are disposed outwardly of a central axis of said upstream oil passage.

6. The hydraulic clutch according to claim 1, wherein said downstream oil passage which is drilled together with said at least one control oil passages axially into one end of said rotational shaft is connected to said upstream oil passage which is drilled axially into the other end of said rotational shaft.

7. The hydraulic clutch for an engine according to claim 1, wherein said hydraulic clutch comprises a first hydraulic clutch and a second hydraulic clutch mounted on said rotational shaft such that said first hydraulic clutch is disposed closer to one end of said rotational shaft along the axis thereof, and said upstream oil passage of said lubricating oil passage extends from the other axial end of said rotational shaft such that said upstream oil passage has an inner end disposed at a position which is aligned, as viewed in side elevation, with said second hydraulic clutch.

8. The hydraulic clutch according to claim 7, wherein at least a portion of said downstream oil passage is defined in a cylindrical tubular shaft which coaxially surrounds said rotational shaft for applying rotational power to the first and second hydraulic clutches and extends parallel to the axis of said rotational shaft.

9. A hydraulic clutch for an engine, the hydraulic clutch being disposed on a rotational shaft having an axis parallel to a crankshaft and rotatably supported in a crankcase, the hydraulic clutch comprising:
switching means for selectively switching between an engaged state and a disengaged state in response to axial movement of the switching means, wherein said switching means is configured between a control hydraulic pressure chamber and a canceler chamber;
first supplying means, connected to said control hydraulic pressure chamber, for supplying oil; and
second supplying means, connected to said canceler chamber, for supplying lubricating oil to lubricated parts around said rotational shaft, wherein said second supplying means comprises an upstream supplying means defined coaxially in said rotational shaft for supplying lubricating oil to the lubricated parts around the rotational shaft, and downstream supplying means connected to said upstream oil passage for supplying lubricating oil from said upstream supplying means to said canceler chamber,
wherein said downstream supplying means is smaller in diameter than said upstream supplying means and has at least a portion extending parallel to the axis of said rotational shaft, and
wherein said first supplying means has an axis parallel to the axis of said rotational shaft and is defined in said rotational shaft such that at least a portion of said first supplying means is disposed in a range wherein said downstream supplying means is provided in a direction along the axis of said rotational shaft.

10. The hydraulic clutch according to claim 9, further comprising connecting means for individually connecting said first supplying means and said downstream supplying means to a plurality of said control hydraulic pressure chambers which are juxtaposed along the axis of said rotational shaft, and
defining means for defining said first supplying means and said downstream supplying means in said rotational shaft such that said first supplying means and said downstream supplying means are disposed at a position wherein said first supplying means and said downstream supplying means are partly superposed on said upstream supplying means on a projection onto a plane perpendicular to the axis of said rotational shaft.

11. The hydraulic clutch according to claim 10, wherein said first supplying means and said downstream supplying means are disposed at equal intervals in a circumferential direction of said rotational shaft.

12. The hydraulic clutch according to claim 10, wherein said downstream supplying means and said first supplying means have the same diameters.

13. The hydraulic clutch according to claim 10, wherein said downstream supplying means and said first supplying means have respective outer ends along a radial direction of said rotational shaft which are disposed outwardly of an inner circumferential surface of said upstream supplying means, and respective inner ends along the radial direction of said rotational shaft which are disposed outwardly of a central axis of said upstream supplying means.

14. The hydraulic clutch according to claim 9, wherein said downstream supplying means which is drilled together with said first supplying means axially into one end of said rotational shaft is connected to said upstream supplying means which is drilled axially into the other end of said rotational shaft.

15. The hydraulic clutch according to claim 9, wherein said hydraulic clutch comprises a first hydraulic clutch and a second hydraulic clutch, and further comprising defining means for defining at least a portion of said downstream supplying means in a cylindrical tubular shaft which coaxially surrounds said rotational shaft for applying rotational power to the first and second hydraulic clutches and extending parallel to the axis of said rotational shaft.

16. A method, comprising:
providing a hydraulic clutch for an engine, the hydraulic clutch being disposed on a rotational shaft having an axis parallel to a crankshaft and rotatably supported in a crankcase;
selectively switching, by a clutch piston, between an engaged state and a disengaged state in response to axial movement of the clutch piston, wherein said clutch piston comprises opposite surfaces facing a control hydraulic pressure chamber and a canceler chamber, respectively;
supplying oil by a control oil passage connected to said control hydraulic pressure chamber; and
supplying, by a lubrication oil passage connected to said canceler chamber, lubricating oil to lubricated parts around said rotational shaft,
wherein the supplying of the lubricating oil comprises supplying, by an upstream oil passage defined coaxially in said rotational shaft, lubricating oil to the lubricated parts around the rotational shaft, and supplying, by a downstream oil passage connected to said upstream oil passage, lubricating oil from said upstream oil passage to said canceler chamber, wherein said downstream oil passage is smaller in diameter than said upstream oil passage and has at least a portion extending parallel to the axis of said rotational shaft, and wherein said control oil passage has an axis parallel to the axis of said rotational shaft and is defined in said rotational shaft such that at least a portion of said control oil passage is disposed in a range wherein said downstream oil passage is provided in a direction along the axis of said rotational shaft.

17. The method according to claim 16, further comprising individually connecting said control oil passage and said downstream oil passage to a plurality of said control hydraulic pressure chambers which are juxtaposed along the axis of said rotational shaft, and defining said control oil passage and said downstream oil passage in said rotational shaft such that said control oil passage and said downstream oil passage are disposed at a position wherein said control oil passage and said downstream oil passage are partly superposed on said upstream oil passage on a projection onto a plane perpendicular to the axis of said rotational shaft.

18. The method according to claim 17, further comprising disposing said control oil passage and said downstream oil passage at equal intervals in a circumferential direction of said rotational shaft.

19. The method according to claim 17, further comprising configuring said downstream oil passage and said control oil passage to have the same diameters.

20. The method according to claim 16, further comprising connecting said downstream oil passage, which is drilled together with said control oil passage axially into one end of said rotational shaft, to said upstream oil passage, which is drilled axially into the other end of said rotational shaft.

* * * * *